(12) United States Patent
Smith et al.

(10) Patent No.: US 9,091,320 B1
(45) Date of Patent: Jul. 28, 2015

(54) MULTI-STAGE SHOCK ABSORBER

(71) Applicant: ThyssenKrupp Bilstein of America, Inc., Hamilton, OH (US)

(72) Inventors: Justin D. Smith, San Diego, CA (US); Austin Z. Dvorak, Carlsbad, CA (US); Terrence J. Kane, Encinitas, CA (US)

(73) Assignee: THYSSENKRUPP BILSTEIN OF AMERICA, INC., Hamilton, OH (US)

( * ) Notice: Subject to any disclaimer, the term of this patent is extended or adjusted under 35 U.S.C. 154(b) by 0 days.

(21) Appl. No.: 14/150,377

(22) Filed: Jan. 8, 2014

(51) Int. Cl.
*F16F 9/48* (2006.01)
*F16F 9/50* (2006.01)

(52) U.S. Cl.
CPC .... *F16F 9/48* (2013.01); *F16F 9/50* (2013.01)

(58) Field of Classification Search
CPC ............... F16F 1/44; F16F 3/087; F16F 9/48; F16F 9/50; B60G 11/52; B60G 2202/1422; B60G 2202/143; B60G 15/065
USPC ............ 267/140.11–140.13, 140.2, 286, 289; 188/284
See application file for complete search history.

(56) References Cited

U.S. PATENT DOCUMENTS

| | | | |
|---|---|---|---|
| 3,111,201 A | 11/1963 | Bliven et al. | |
| 4,307,794 A | 12/1981 | Maciejewski | |
| 5,219,414 A | 6/1993 | Yamaoka | |
| 5,224,689 A | 7/1993 | Georgiev | |
| 5,535,862 A | 7/1996 | Jentsch et al. | |
| 5,595,270 A | 1/1997 | Braun et al. | |
| 5,860,498 A | 1/1999 | Pradel | |
| 6,085,876 A | 7/2000 | Deferme | |
| 6,626,274 B2 * | 9/2003 | Pfundstein et al. | 188/284 |
| 6,648,310 B2 | 11/2003 | Rottenberger et al. | |
| 6,651,787 B2 | 11/2003 | Grundel | |
| 6,681,906 B1 | 1/2004 | Sasse | |
| 6,691,840 B1 | 2/2004 | Lisenker et al. | |
| 6,763,920 B2 | 7/2004 | Finley | |
| 6,776,269 B1 | 8/2004 | Schel | |
| 6,814,193 B2 * | 11/2004 | Grundei | 188/322.15 |
| 6,843,352 B2 | 1/2005 | Jacoby et al. | |
| 7,021,435 B2 | 4/2006 | Lisenker et al. | |
| 7,156,214 B2 | 1/2007 | Pradel et al. | |
| 7,172,057 B2 | 2/2007 | Gundermann et al. | |
| 7,172,058 B2 | 2/2007 | Burkert et al. | |
| 7,866,452 B2 | 1/2011 | Brehm et al. | |
| 7,975,994 B2 | 7/2011 | Born et al. | |
| 8,037,982 B2 | 10/2011 | Satou et al. | |
| 8,109,491 B2 | 2/2012 | Handke et al. | |
| 8,127,901 B1 | 3/2012 | Lu | |
| 8,162,112 B2 | 4/2012 | Gartner et al. | |
| 8,191,692 B2 | 6/2012 | Mori et al. | |

(Continued)

OTHER PUBLICATIONS

The International Search Report and Written Opinion, issued on May 1, 2015, in the related PCT Patent Application No. PCT/US15/10300.

*Primary Examiner* — Vishal Sahni

(57) ABSTRACT

A jounce control damping system with an elongated housing containing a damping medium, a primary piston assembly, a moveable outer piston assembly, and a movable inner piston assembly disposed at least partially within the outer piston assembly. The primary piston assembly provides a first compression damping force. The inner piston engages the primary piston assembly and provides a second compression damping force when moved in a compression direction. After the inner piston assembly moves a given distance, the outer piston assembly is moved in the compressive direction and provides a third compression damping force.

17 Claims, 6 Drawing Sheets

(56) References Cited

U.S. PATENT DOCUMENTS

| | | | |
|---|---|---|---|
| 8,360,210 B2 | 1/2013 | Kigawa | |
| 2003/0051957 A1* | 3/2003 | Lemieux | 188/322.15 |
| 2006/0290037 A1* | 12/2006 | Born et al. | 267/120 |
| 2010/0236882 A1 | 9/2010 | Uchiyama | |
| 2012/0018264 A1 | 1/2012 | King | |

* cited by examiner

MULTI-STAGE SHOCK ABSORBER

FIELD OF THE INVENTION

The present invention pertains to improvements in shock absorbers, and more particularly to shock absorbers having position-dependent damping force characteristics.

BACKGROUND

Shock absorbers are used in vehicles to assist the vehicle in adapting to different driving conditions due to irregularities in the road, such as bumps, potholes, and other road surface anomalies. Shock absorbers are also used to assist a vehicle in traveling over more extreme conditions such as off-road driving.

In conditions such as off-road driving, the irregularities can be severe and may cause a standard shock absorber to bottom out, i.e. abruptly reaching their maximum compression, producing a jarring impact. In order to overcome this deficiency shock absorbers with jounce control have been developed. A jounce control shock absorber provides an elevated damping force when the shock approaches the bottoming out condition. However, known jounce control systems are limited in their effectiveness due to the fact that such system only provide one stage of an elevated damping force.

SUMMARY OF THE INVENTION

The invention is directed to a system that implements a novel and unobvious jounce control shock absorber in the form of a jounce control shock absorber with multi-stage jounce control.

One aspect of the jounce control damping system of the present invention comprises an elongated housing containing a damping medium, a moveable outer piston assembly disposed within the housing and a movable inner piston assembly disposed at least partially within the outer piston assembly. The inner piston assembly being configured to engage a primary piston assembly as said primary piston assembly is moved beyond a first compression movement distance causing the inner piston assembly to move in the compressive direction. The outer piston assembly being configured to move in the compressive direction in response to the inner piston assembly moving in the compressive direction beyond a second compressive movement distance. The primary piston assembly provides a first compression damping force during the first compression movement distance of the primary piston. The inner piston assembly provides a second compression damping force greater than the first damping force during the second compression movement distance of the inner piston assembly and the outer piston assembly provides a third compression damping force greater than the second compression damping force during the third compression movement distance.

In another aspect of the present invention, the inner piston assembly comprises an element for engaging the primary piston assembly. The element can be at least one aperture that permits the damping medium to flow through the aperture during movement of the inner piston in a compressive direction. The at least one aperture can also be configured to engage an at least one valve assembly of the primary piston assembly for regulating the flow of the damping medium through the at least one aperture during movement of the inner piston assembly in the compressive direction.

It is a further aspect of the present invention for the inner piston assembly to be disposed within a recessed cavity of the outer piston assembly. An inner restoration spring may also be disposed in the outer piston assembly recessed cavity and configured to provide an expansive force on the inner piston assembly. An outer restoration spring may also be provided in the elongated housing to provide an expansive force on the outer piston assembly.

It is yet another aspect of the present invention for the outer piston assembly to be disposed and moveable within a second housing. The second housing may be formed integral with the elongated housing.

It is further an aspect of the present invention for the second housing to be disposed and moveable in a third housing such that the second housing is configured to serve as a piston. When the second housing acts as a piston it may provide a fourth compression damping force greater than the third compression damping force during a fourth compression movement distance of the piston rod. In such an embodiment the second housing may comprise at least one aperture that permits damping medium to flow from the third housing.

It is still a further aspect of the present invention to provide multistage damping system with an elongated housing containing a damping medium, an axially moveable primary piston assembly arranged in the housing comprising a primary piston and a valve assembly, and an axially moveable secondary piston assembly. The axially moveable secondary piston may have an orifice disposed in a location to engage the valve assembly when the primary piston assembly is moved in a compressive direction beyond a particular compressive movement distance. When the valve assembly engages the orifice, it regulates the flow of damping medium to provide a greater compressive damping force when said primary piston assembly and said secondary piston assembly are moved beyond the particular compressive movement distance. The invention may include an axially moveable tertiary piston assembly having a recessed cavity formed therein with the secondary piston assembly disposed therein.

It is yet another aspect of the present invention to provide a multistage damping system with an elongated housing containing a damping medium, an axially moveable primary piston assembly arranged in the housing comprising a first piston and a first element of a valve assembly, and an axially moveable secondary piston assembly having a second element of a valve assembly disposed in a location to engage the valve assembly first element when the primary piston assembly is moved in a compressive direction beyond a particular compressive movement distance. When the first and second valve assembly elements are engaged they flow of the damping medium is regulated to provide a greater compressive damping force when the primary piston assembly and the secondary piston assembly are moved beyond said particular compressive movement distance.

BRIEF DESCRIPTION OF THE DRAWING

A more complete understanding of the present disclosure may be realized by reference to the accompanying drawing in which.

Figure 1:
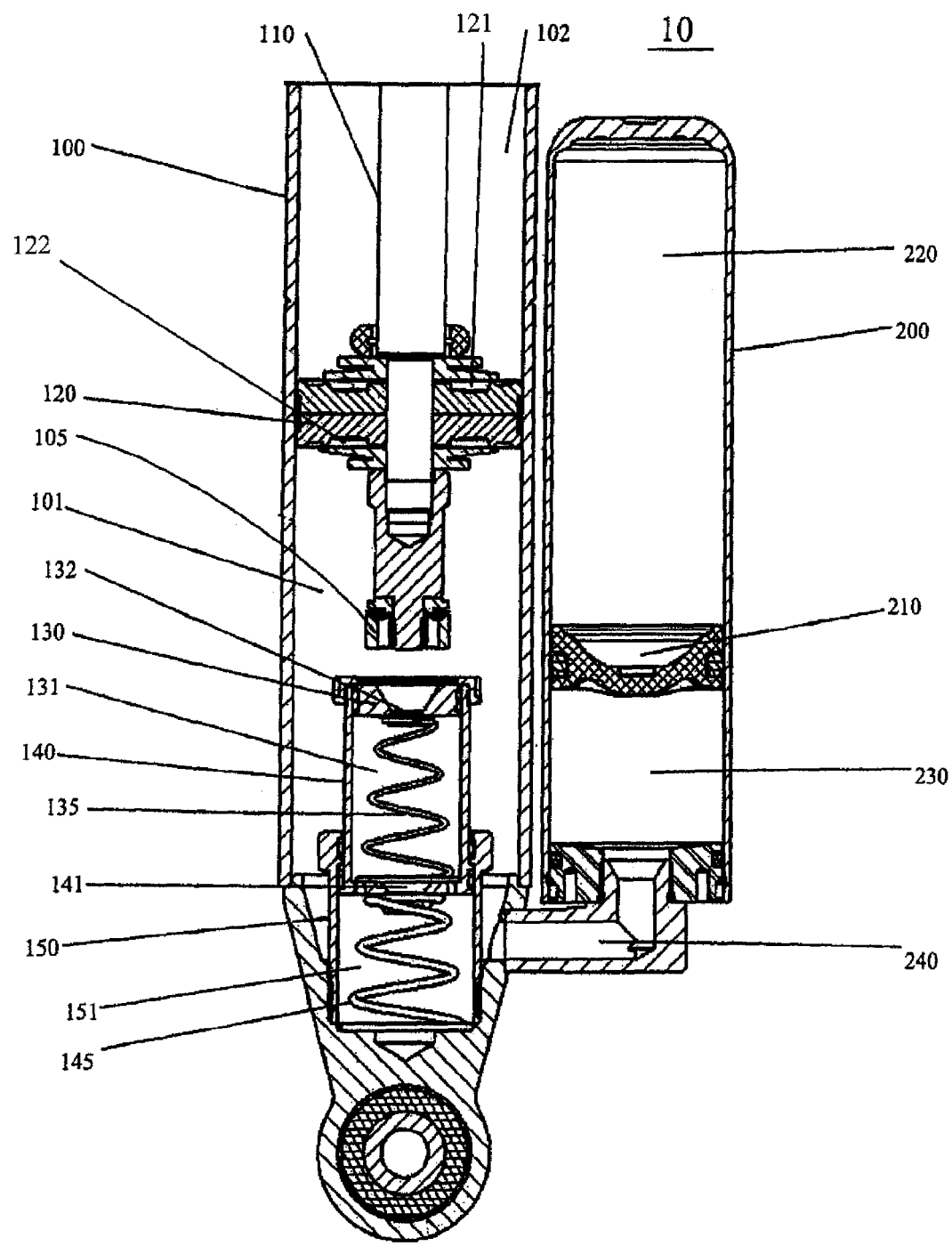
FIG. 1 is a cross-sectional view of an exemplary shock absorber configured in accordance with the present invention.

The illustrative embodiments are described more fully by the Figures and detailed description. The inventions may, however, be embodied in various forms and are not limited to specific embodiments described in the Figures and detailed description.

DETAILED DESCRIPTION

The invention is directed to a shock absorber advantageously for use with a vehicle suspension. The shock absorber increases the damping force when there is significant travel of the vehicle suspension. In particular, as the suspension reaches a bottoming out condition during compression, the damping force of the shock absorber increases. The present invention provides unique and novel mechanisms for increasing the damping force depending on the position of the shock absorber during compression so as to significantly reduce or avoid a bottoming out condition. As discussed below, the shock absorber of the present invention sequentially increases the damping force using a multi-stage jounce control configuration.

For the purposes of promoting an understanding of the principles of the invention, reference will now be made to the embodiment illustrated in the drawings and specific language will be used to describe the same. It will nevertheless be understood that no limitation of the scope of the invention is thereby intended. The following illustrates the principles of the disclosure. It will thus be appreciated that those skilled in the art will be able to devise various arrangements which, although not explicitly described or shown herein, embody the principles of the disclosure and are included within its spirit and scope.

All examples and conditional language recited herein are principally intended expressly to be only for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

FIG. 1 shows a cross-sectional perspective view of an exemplary shock absorber 10 in accordance with the present invention. The shock absorber 10 comprises an elongated housing 100 with a first piston 120 coupled to piston rod 110 forming a primary piston assembly. First piston 120 is slidably received within the inner diameter of elongated housing 100. First piston 120 separates the internal volume of housing 100 into a primary compression volume 101 located between piston 120 and the distal end of the shock absorber and a rebound volume 102 located between piston 120 and the proximal end of the shock absorber.

First piston 120 includes valves 121 and 122. Valve 121 permits the damping medium to flow from the compression volume 101 to the rebound volume 102. Valve 122 permits fluid to flow from the rebound volume 102 to the compression volume 101. The distal end of first piston 120 comprises a piston rod valve assembly 105 that engages second piston 130 as the piston rod 110 moves in the compressive direction. The piston rod valve assembly 105 controls the flow of the damping medium through apertures in the second piston 130 and flask 140. For the reasons discussed below, the flask 140 is alternatively referred to as third piston 140.

Also disposed within housing 100 are a flask 140 and cup 150, which house second 130 piston and third 140 piston, respectively. Disposed within flask 140 is second piston 130. Second piston 130 is slidably received within the inner diameter of flask 140. Second piston 130 forms a second compression volume 131 between second piston 130 and the distal end of flask 140. Second piston 130 comprises at least one aperture 132 through which the damping medium may flow as the second piston 130 moves in the compressive direction.

Also disposed within flask 140 is a first return spring 135. In the dipicted embodiment, first return spring 135 is a conical spring that reduces to the thickness of the wire diameter upon compression. However, it should be understood by one having ordinary skill in the art, that other types of springs are useable for first return spring 135 including, for example, wave springs, Belleville springs, and the like that are known in the art. The first return spring 135 provides an expansive force on second piston 130 and returns the second piston 130 to its initial position when the piston rod 110 moves in the expansive direction.

Flask 140 is disposed at least partially in cup 150. Flask 140 is slidably received within the inner diameter of cup 150 and acts as a third piston. Flask 140 forms a third compression volume 151 between flask 140 and the distal end of cup 150. The distal end of flask 140 comprises an aperture 141 through which the damping medium may flow as the third piston 140 moves in the compressive direction. Cup 150 may be formed integral with the housing. Also disposed within cup 150 is a second return spring 145.

In the depicted embodiment in FIG. 1, second return spring 145 is a conical spring that reduces to the thickness of the wire diameter upon compression. As with the first return spring 135, alternative spring types are useable for the second return spring 145. The second return spring 145 provides an expansive force on flask 140 and returns the third piston 140 to its initial position when the piston rod 110 moves in the expansive direction.

The shock absorber 10 also includes a second cylinder 200 in communication with the main tube 100. The second cylinder 200 includes a reserve piston 210 that separates gas reservoir 220 from damping medium chamber 230. A flow path 240 permits the damping medium to flow between the primary compression chamber and the damping medium chamber 230.

FIGS. 2A-2D provide a cross-sectional view of the shock absorber 10 of FIG. 1 and illustrate the characteristics of the shock absorber during a compression cycle. FIG. 3 provides a chart illustrating the compression damping force versus distance provided by shock absorber 10 as the shock absorber moves through the three compression stages discussed below.

Figure 2A:
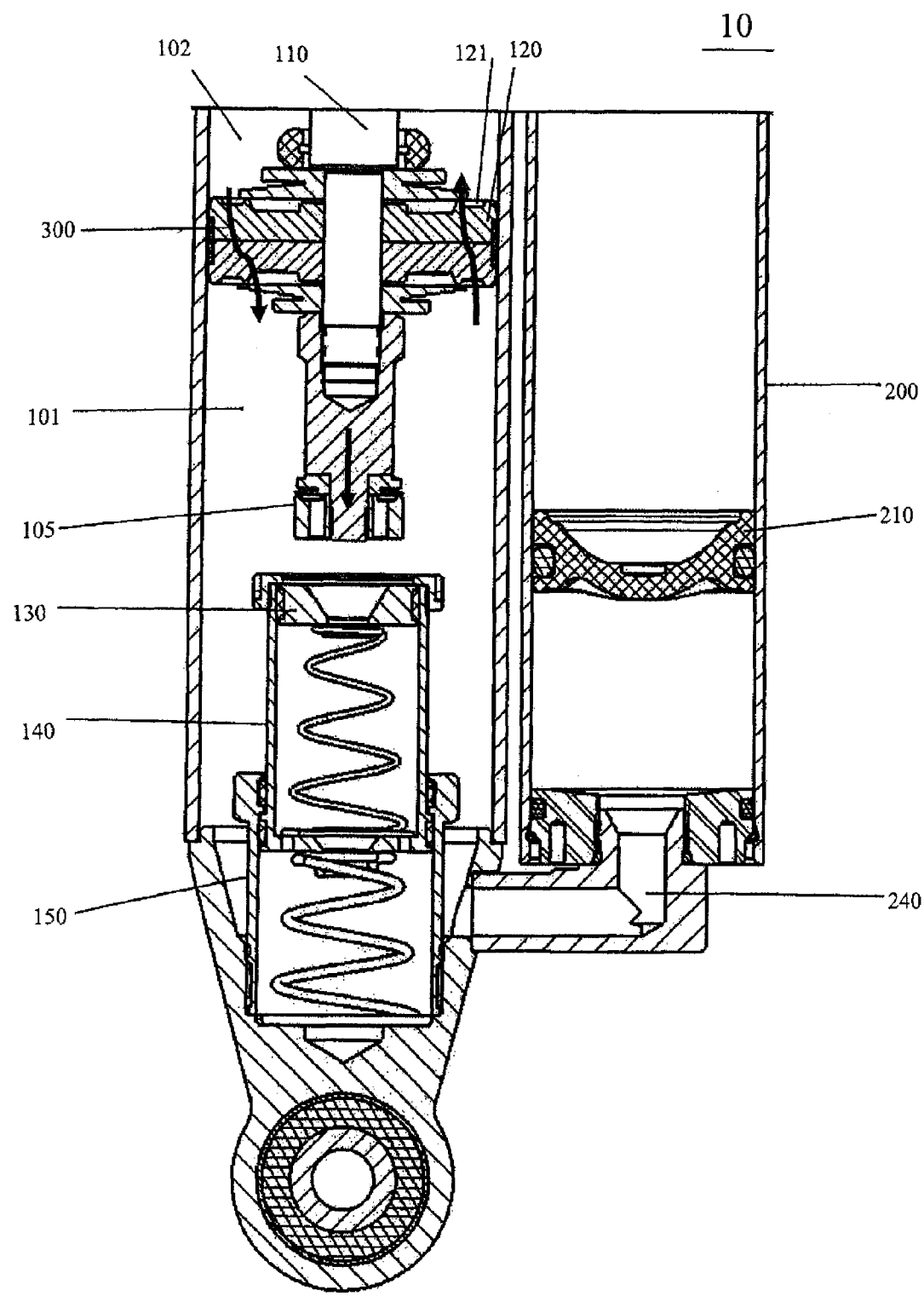
FIG. 2A is a cross-sectional view of the shock absorber of FIG. 1 in a first stage of operation.
Figure 3:
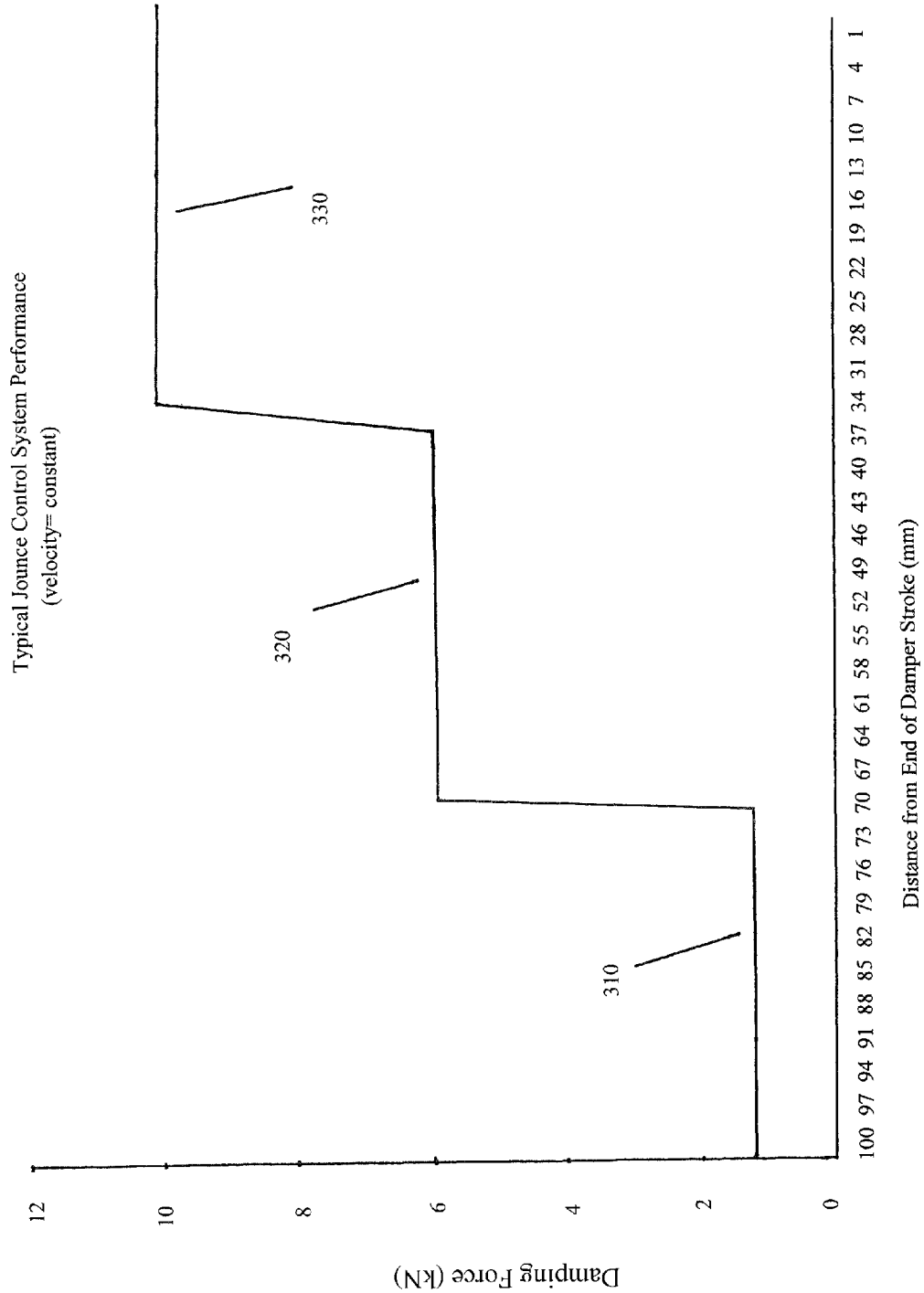
FIG. 3 is chart illustrating the compression damping force versus distance provided by the exemplary shock absorber of FIG. 1.

As shown in FIG. 2A, initially, during a first compression stage of shock absorber 10, piston rod 110 and first piston 120 are moved in the compressive direction, i.e. the distal direction, over a first distance and provide a first compression damping force 310 (shown in FIG. 3). During the first compression stage the valve 121 regulates flow of the damping medium from the compression volume 101 to the rebound volume 102 as depicted by flow arrows 300. This causes the size of the compression volume 101 to be reduced and the rebound volume 102 to enlarge. The first compression stage continues until the piston rod valve assembly 105 engages second piston 130.

Figure 2B:
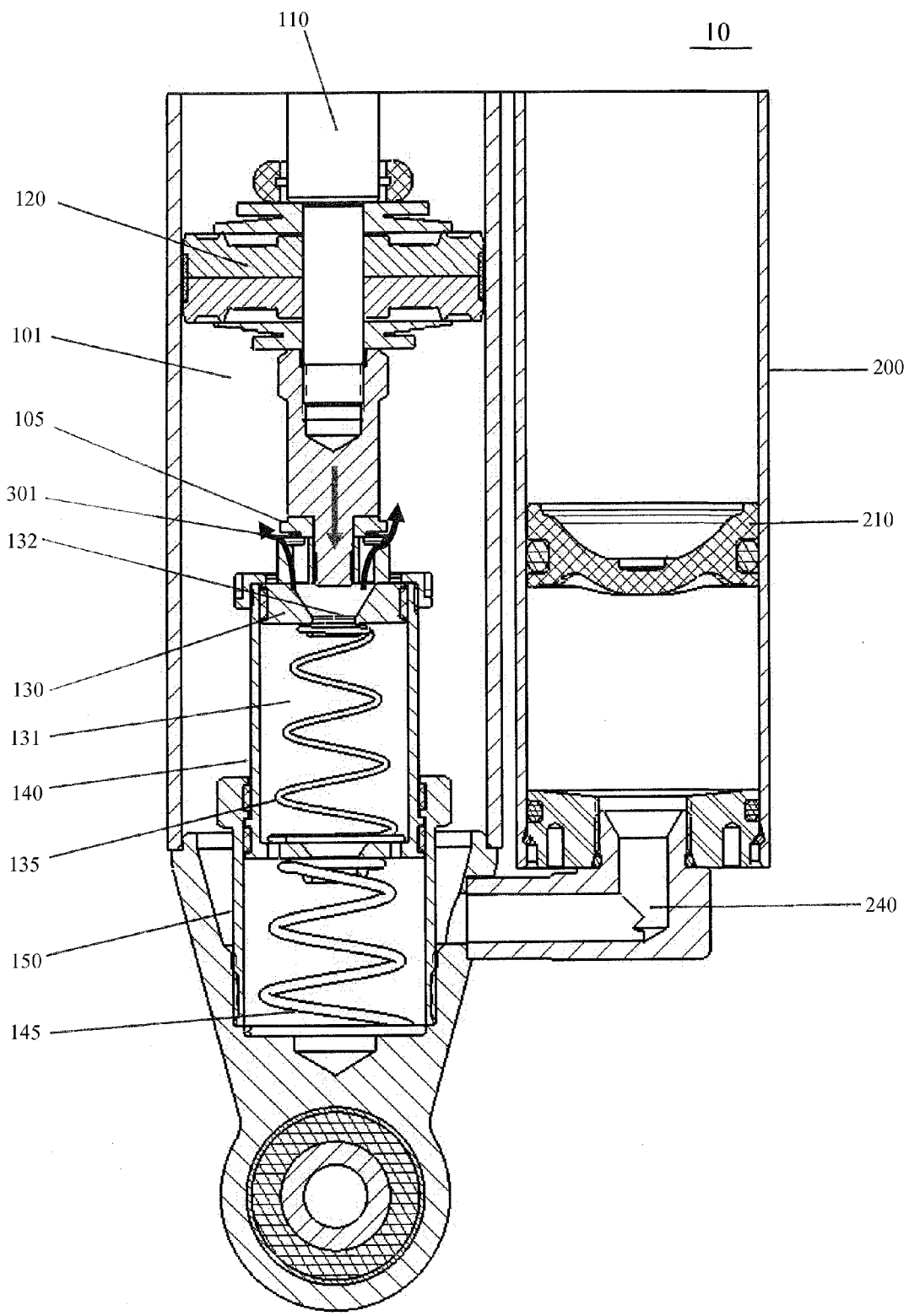
FIG. 2B is a cross-sectional view of the shock absorber of FIG. 1 in a second stage of operation.
Figure 2C:
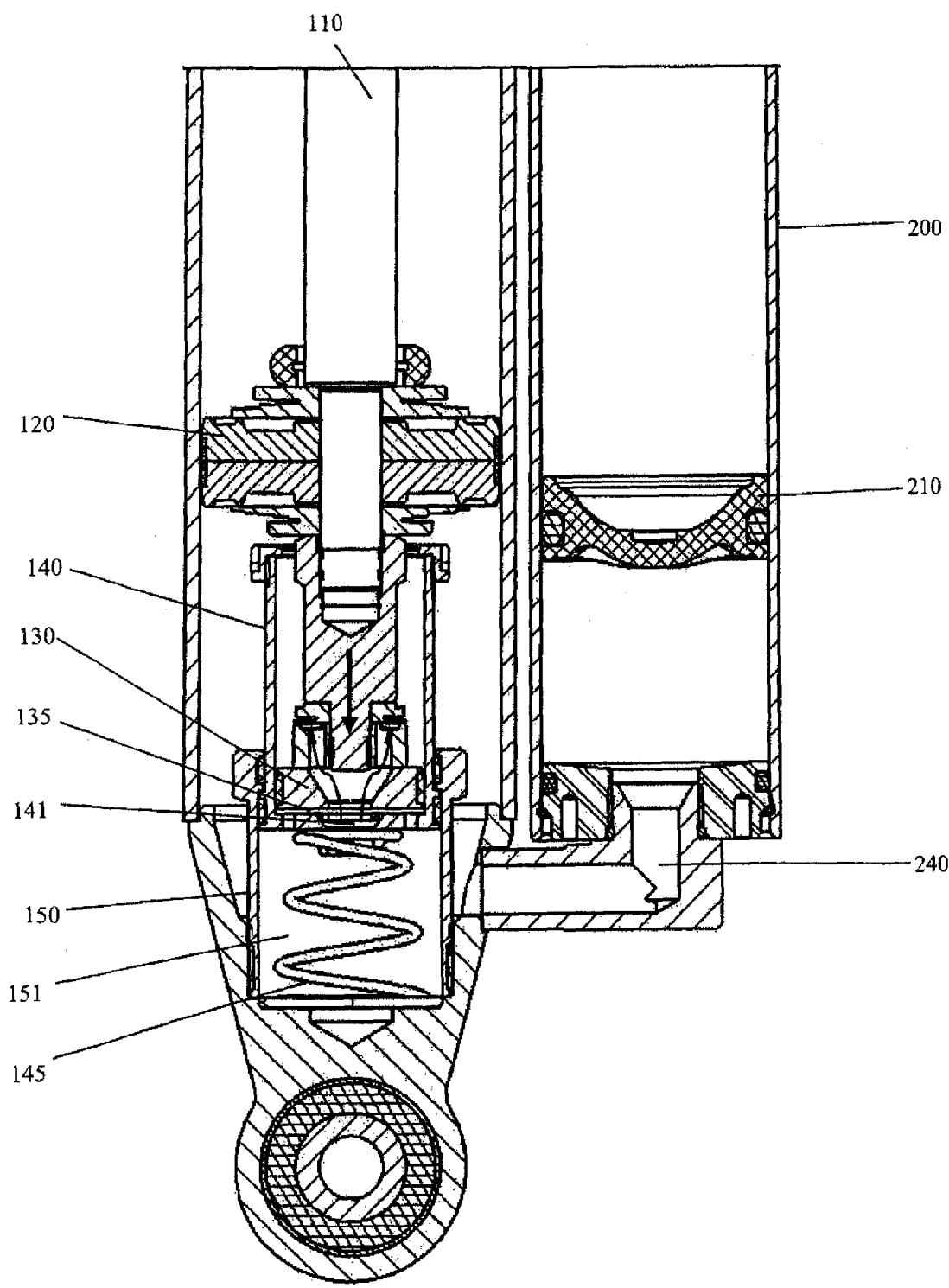
FIG. 2C is a cross-sectional view of the shock absorber of FIG. 1 in a third stage of operation.
Figure 2D:
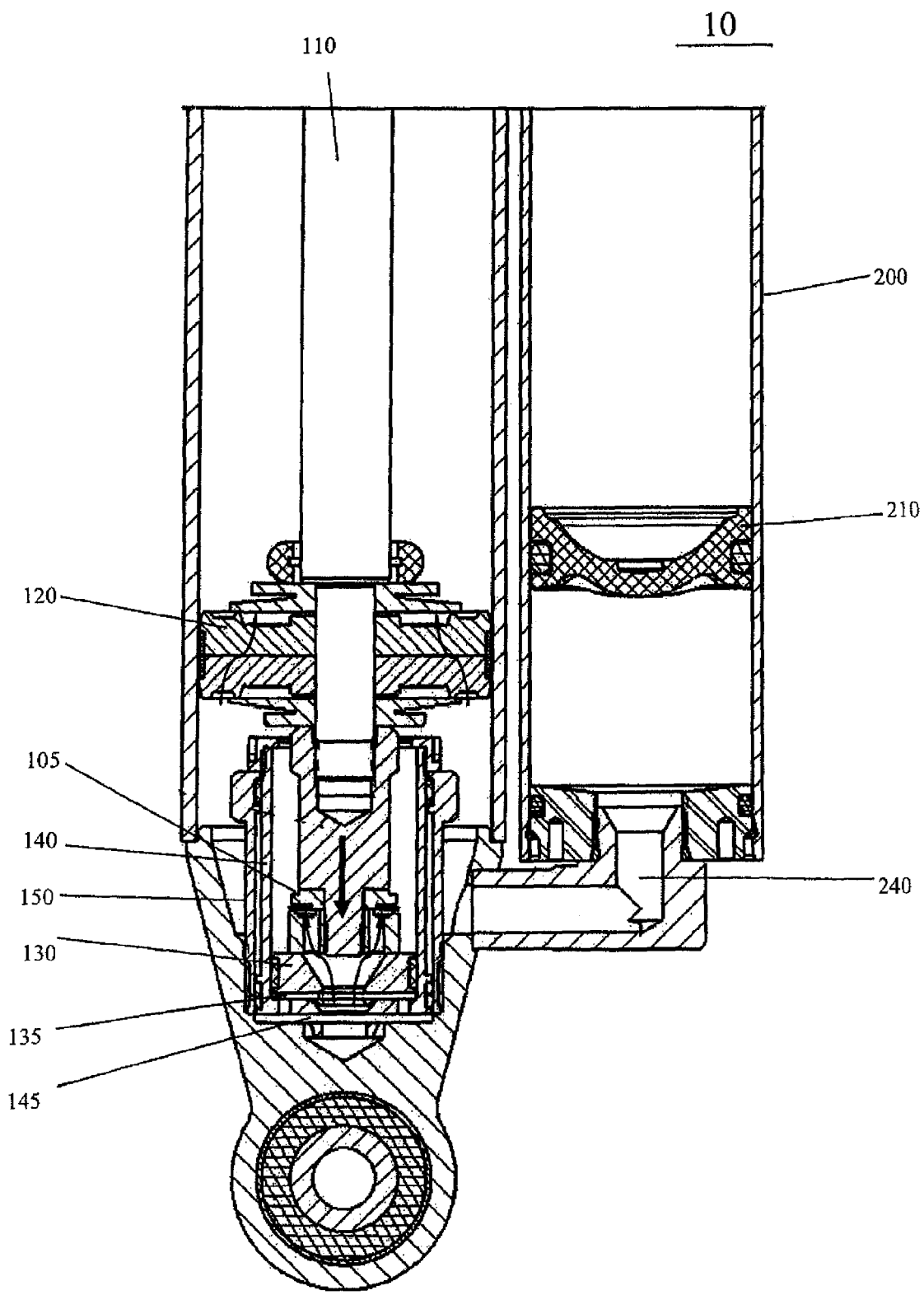
FIG. 2D is a cross-sectional view of the shock absorber of FIG. 1 in a fourth stage of operation.

As shown in FIG. 2B, when the first piston assembly compresses beyond the first distance, the piston rod valve assembly 105 will engage second piston 130 and the assembly 105 covers the at least one aperture 132 of second piston 130. The piston rod valve assembly 105 communicates with the aperture 132 of second piston 130 and controls the flow of the damping medium through the aperture 132 as depicted by flow arrows 301. After engagement, as the piston rod 110 begins to move in the compressive direction over a second distance, a second compression stage begins. During the second compression stage, the combination of the piston rod valve assembly 105 with the second piston 130 provides a second compression damping force 320 that is greater than the first compression damping force 310 (shown in FIG. 3).

During the second compression stage the piston rod valve assembly 105 permits the damping medium to flow from the second compression volume 131 to the primary compression volume 101. This causes the size of the second compression volume 131 to be reduced. The second compression stage continues until the second piston rod reaches the distal end of flask 140.

When the second piston 130 reaches the distal end of flask 140, flask 140 acting as the third piston begins to move in the compressive direction over a third distance. This provides the beginning of a third compression stage. During the third compression stage, the piston rod valve assembly 105 controls the flow of the damping medium from the third compression volume 151 through the aperture 141 at the distal end of flask 140. This causes the size of the third compression volume 151 to be reduced. The combination of the piston rod valve assembly with the flask 140 provides a third compression damping force 330 that is greater that the first compression damping force 310 and second compression damping force 320 (shown in FIG. 3).

It should be readily understood that selection of the dimensions for the housing and valves configurations enable a shock designer to change the corresponding damping forces provided. The damping forces useable for a particular automotive or other application are determined based upon, for example, the weight of the vehicle, type of suspension and intended application. Exemplary ranges for damping forces for first, second and third compression damping forces include, for example, 0.6 kN-2.0 kN, 4.0 kN-8.0 kN, and 8.0 kN-12.0 kN, respectively.

Likewise, exemplary ranges for the first, second and third compression distances from full compression include for example, 150 mm 300 mm, 35 mm-70 mm and 0 mm-35 mm, respectively. The damping force for each compression stage is chosen by optimizing or altering the components of the shock absorber described herein. For instance, the damping force can be controlled by the valve disc selection in pistons 120 and 105. Also, the damping force in the third zone can be controlled by modifying the internal diameters of the flask 140 and cup 150. The engagement point of the second piston 130 to piston rod valve assembly 105 or the engagement point of the second piston 130 to the distal end of flask 140 can be used to alter damping force timing.

While the invention has been described in based on the above example, those skilled in the art will recognize that the invention is not limited to this particular embodiment. The above description points out the fundamental novel features of the invention as applied to a preferred embodiment. It will be readily recognized by those skilled in the art that various omissions and substitutions and changes in the form and details of the devices illustrated, and in their operation, may be made without departing from the spirit of the invention.

For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Further, while the example shown above employed a single aperture 132, 141 in the second piston 130 and third piston 140, it should be readily apparent to one skilled in the art, that a shock absorber in accordance with the invention may alternatively employ, for example, second 130 and third 140 pistons with multiple apertures that permit the damping medium to flow out of a compression volume.

Still further, one skilled in the art may alternatively dispose the piston rod valve assembly 105 on the second piston 130 instead of the depicted location on the piston rod 110 in FIGS. 1 and 2A-2D. In such an embodiment, valve assembly 105 would be coupled or integral with second piston 130. Either piston rod 110, first piston 120, or another element coupled to either element would contact the valve assembly 105 and consequently move second piston 130 in the compressive direction with a desired damping force.

We claim:

1. A jounce control damping system comprising:
   an elongated housing containing a damping medium;
   a moveable outer piston assembly disposed within the housing;
   a movable inner piston assembly disposed at least partially within the outer piston assembly;
   said inner piston assembly being configured to engage a primary piston assembly as said primary piston assembly is moved beyond a first compression movement distance through the damping medium causing the inner piston assembly to move in the compressive direction through the damping medium; and
   said outer piston assembly being configured to move in the compressive direction through the damping medium in response to the inner piston assembly moving in the compressive direction through the damping medium beyond a second compressive movement distance,
   wherein the primary piston assembly provides a first compression damping force during the first compression movement distance of the primary piston;
   wherein the inner piston assembly provides a second compression damping force during the second compression movement distance of the inner piston assembly and the outer piston assembly provides a third compression damping force greater than the second compression damping force during the third compression movement distance;
   wherein the outer piston assembly forms a housing for the inner piston assembly;
   wherein the outer piston assembly is disposed and moveable within a second housing;
   wherein the damping medium flows through the primary piston assembly, the inner piston assembly and the outer piston assembly.

2. The system of claim 1, wherein the inner piston assembly comprises an element for engaging the primary piston assembly.

3. The system of claim 2, wherein said element comprises at least one aperture that permits the damping medium to flow through the aperture during movement of the inner piston in a compressive direction.

4. The system of claim 3, wherein the at least one aperture is configured to engage an at least one valve assembly of the primary piston assembly for regulating the flow of the damping medium through the at least one aperture during movement of the inner piston assembly in the compressive direction.

5. The system of claim 1, wherein said inner piston assembly is disposed within a recessed cavity of the outer piston assembly.

6. The system of claim 5, further comprising an inner restoration spring disposed in the outer piston assembly recessed cavity and configured to provide an expansive force on the inner piston assembly.

7. The system of claim 1 wherein the second housing is formed integral with the elongated housing.

8. The system of claim 1, wherein at least a portion of the second housing is disposed and moveable in a third housing such that the second housing is configured to serve as a piston.

9. The system of claim 8, wherein the second housing when operating as a piston provides a fourth compression damping force greater than the third compression damping force during a fourth compression movement distance of the piston rod.

10. The system of claim 9, wherein the second housing comprises at least one aperture that permits damping medium to flow from the third housing.

11. The system of claim 1, further comprising an outer restoration spring in said elongated housing for providing an expansive force on the outer piston assembly.

12. A multistage damping system comprising:
an elongated housing containing a damping medium;
an axially moveable primary piston assembly arranged in the housing comprising a primary piston and a valve assembly;
an axially moveable secondary piston assembly having an orifice disposed in a location to engage said valve assembly when said primary piston assembly is moved in a compressive direction beyond a particular compressive movement distance, wherein said valve assembly once engaged with said orifice regulates the flow of damping medium to provide a greater compressive damping force when said primary piston assembly and said secondary piston assembly are moved beyond said particular compressive movement distance;
an axially moveable tertiary piston assembly having a recessed cavity formed therein, wherein said secondary piston assembly is disposed within said recessed cavity; and
a second housing wherein the tertiary piston assembly is disposed and moveable within the second housing,
wherein the damping medium flows through the primary piston assembly, the secondary piston assembly and the tertiary piston assembly.

13. The system of claim 12 further comprising a first restoration spring disposed in the recessed cavity and configured to provide providing an expansive force on the secondary piston assembly.

14. The system of claim 12 wherein the second housing is formed integral with the elongated housing.

15. The system of claim 12, wherein the tertiary piston assembly is configured to provides a third compression damping force greater than the second compression damping force during a third compression movement distance of the piston assemblies.

16. The system of claim 12, wherein the tertiary piston assembly comprises at least one aperture configured to permits the damping medium to flow into said secondary piston assembly.

17. The system of claim 12 further comprising a second restoration spring configured to provide an expansive force on the tertiary piston assembly.

* * * * *